US005646932A

United States Patent [19]
Kuribayashi et al.

[11] Patent Number: 5,646,932
[45] Date of Patent: Jul. 8, 1997

[54] OPTICAL DISK, TRACKING ERROR SIGNAL GENERATING APPARATUS, AND TRACKING CONTROL APPARATUS

[75] Inventors: Hiroki Kuribayashi; Fumihiko Yokogawa, both of Tsurugashima, Japan

[73] Assignee: Pioneer Electronic Corporation, Tokyo, Japan

[21] Appl. No.: 371,119

[22] Filed: Jan. 11, 1995

Related U.S. Application Data

[62] Division of Ser. No. 87,853, Jul. 9, 1993, Pat. No. 5,434,836.

[30] Foreign Application Priority Data

Jul. 17, 1992 [JP] Japan ................................. 4-191057

[51] Int. Cl.⁶ ............................................. G11B 7/24
[52] U.S. Cl. ............................ 369/275.3; 369/44.26
[58] Field of Search ....................... 369/275.1–275.4, 369/44.13, 44.26–44.29, 54, 48, 44.34

[56] References Cited

U.S. PATENT DOCUMENTS

| 5,063,546 | 11/1991 | Ito et al. | 369/44.26 |
| 5,099,467 | 3/1992 | Sumihiro et al. | 369/44.26 |
| 5,128,916 | 7/1992 | Ito et al. | 369/44.26 |
| 5,157,645 | 10/1992 | Takahara et al. | 369/44.28 |
| 5,191,571 | 3/1993 | Fukumoto et al. | 369/44.37 |
| 5,193,081 | 3/1993 | Osawa et al. | 369/44.26 |
| 5,214,629 | 5/1993 | Watanabe et al. | 369/44.26 |
| 5,272,686 | 12/1993 | Shigemori | 369/44.26 |

*Primary Examiner*—Nabil Hindi
*Attorney, Agent, or Firm*—Young & Thompson

[57] ABSTRACT

An optical disk includes: a plurality of recording tracks, each of the recording tracks having a data area for storing data, and a servo control information area for storing servo information; and tracking pits respectively formed on n neighboring recording tracks, which are adjacent to each other in a radial direction of the optical disk, where n is an integer not less than 3. The tracking pits are located in the servo control information area of each of the n neighboring recording tracks and are spaced apart from each other by a distance not less than a radius of a beam spot for reading data from the optical disk. The tracking pits of the n neighboring recording tracks are located on different radial lines of the optical disk.

2 Claims, 15 Drawing Sheets

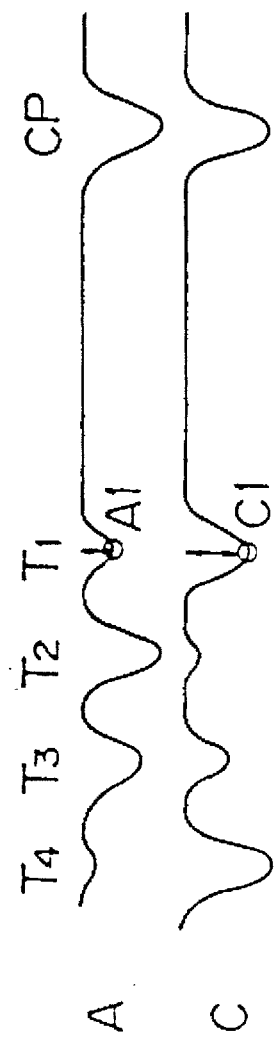
F I G. 10A
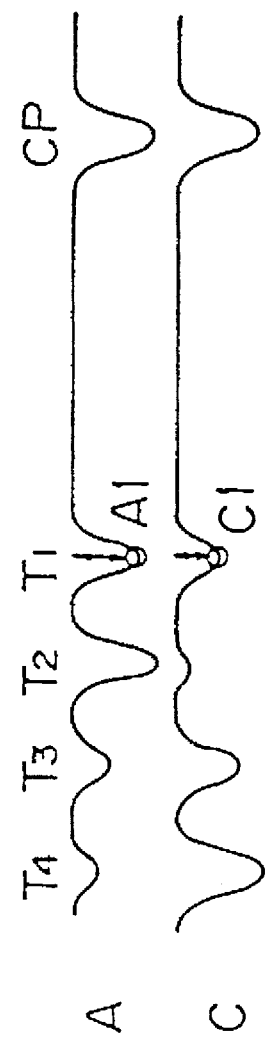
F I G. 10B

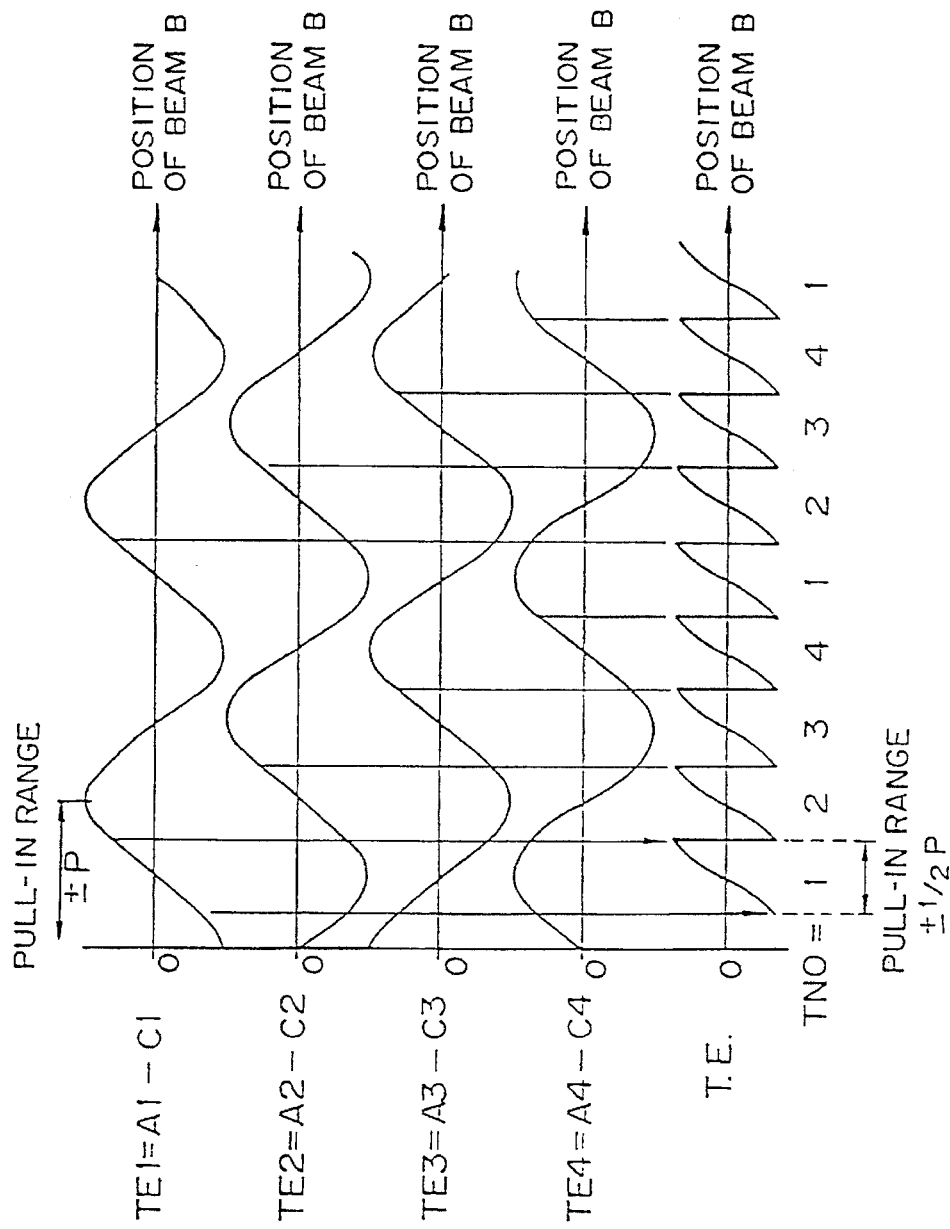

FIG. 15

TIMING SELECTING TABLE

| SIGNAL LEVEL MAX | B1 | B2 | B3 | B4 |
|---|---|---|---|---|
| OUTPUT OF 1ST SELECTING CIRCUIT | B4 | B1 | B2 | B3 |
| OUTPUT OF 2ND SELECTING CIRCUIT | B2 | B3 | B4 | B1 |

OPTICAL DISK, TRACKING ERROR SIGNAL GENERATING APPARATUS, AND TRACKING CONTROL APPARATUS

This application is a division of application Ser. No. 08/087,853, filed Jul. 9, 1993, now U.S. Pat. No. 5,434,836.

BACKGROUND OF THE INVENTION

1. Field of the Invention

The present invention relates to an optical disk, a tracking error signal generating apparatus, and a tracking control apparatus. More particularly, the present invention is concerned with a high-recording-density optical disk using a sampled servo method, a tracking error signal generating apparatus for generating a tracking error signal from such an optical disk, and a tracking control apparatus for performing tracking control of such an optical disk.

2. Description of the Related Art

There is a recording format based on a sampled servo method as a recording format of an optical disk.

FIG. 1 shows a recording format of an optical disk of the sampled servo method. The optical disk based on the sampled servo method does not have any pre-grooves (guide grooves) on a recording film of the optical disk, but servo areas (fields) at 1376 points in one track are pre-formatted. The optical disk based on the sampled servo method is characterized in that a tracking error and a clock for recording/reproducing can be generated by sampling by means of the pre-format.

As shown in FIG. 1, a signal track having a spiral form extending from the inner portion of an optical disk DK to the outer portion thereof is formed in a program area PA of the optical disk DK. One track is divided into 32 sectors. Each of the sectors includes 43 segments, and each of the segments contains 18 bytes. In the first segment #0 of one sector are pre-formatted a sector synchronizing signal $S_{sync}$ (two bits) for establishing synchronization for each sector and a sector address $S_{ADR}$ (16 bits) for indicating the address of the above sector. The above pre-formatting is performed in the process of mastering of the optical disk. Each of the segments #1 to #42 consists of a 18-byte area including a two-byte servo area $F_S$ and a 16-byte data area $F_D$.

FIG. 2 shows a recording format of the servo area $F_S$. The two-byte servo area $F_S$ is segmented into two servo bytes #1 and #2. A first wobble pit $P_{W1}$ is pre-formatted at bit of the servo byte #1, and a second wobble pit $P_{W2}$ is pre-formatted at the eighth bit thereof. As shown in FIG. 2, the position of the first wobble pit $P_{W1}$ is located at the third bit in 16 tracks (A), and is indicated as $P_{W1A}$. The position of the first wobble pit $P_{W1}$ is located at the fourth bit in 16 tracks (B), and is indicated as $P_{1B}$. In this manner, since the position of the first wobble pit $P_{W1}$ is changed every 16 tracks, the number of tracks crossing during searching can be correctly detected.

The first wobble pit $P_{W1}$ and the second wobble pit $P_{W2}$ are disposed so that these pits are respectively shifted, by ¼ of the track pitch, from a track center TC in a direction (the radial direction of the writable optical disk DK) perpendicular to the tracing direction. A tracking error detection is performed on the basis of the difference between the quantity of a return light obtained at the first wobble pit $P_{W1}$ and the quantity of a return light obtained at the second wobble pit $P_{W2}$. A clock pit CP for synchronization is pre-formatted at the 12th bit in the servo byte #2. A space between the second wobble pit $P_{W2}$ and the clock pit CP has a mirror surface and has a clock length equal to 19 channels. Synchronization can be established for each segment by counting this 19 channel clock pre-formatted in the above space. Focus error detection is also carried out during the synchronization detection period. FIG. 2 shows a signal $S_{T1}$ ($S_{T1A}$ or $S_{T1B}$) for use in tracking and the sector synchronizing signal $S_{sync}$, these signals being obtained by reading the servo area $F_S$ by the laser beam.

A description will now be given, with reference to FIG. 3, of a method for detecting a tracking error by means of wobble pits. A reference A indicates a first case where the read beam runs on the center axis (track center axis) between a pair of wobble pits $P_{W1}$ and $P_{W2}$. An RF signal obtained in the first case is indicated as $S_A$. When the read beam runs near the wobble pit $P_{W1}$ or $P_{W2}$, a small quantity of reflected light is obtained due to the optical diffraction effect, and the reflected light becomes dark. When the read beam passes just on the clock pit CP, the darkest reflected light is obtained. A reference B indicates a second case where the read beam moves on a portion deviating from the track center axis towards the inner circle end of the optical disk. The RF signal obtained in the second case is indicated as $S_B$. In the second case, since the read beam passes just on the wobble pit $P_{W1}$, the dark portion by the wobble pit $P_{W1}$ is darker than that by the wobble pit $P_{W2}$. A reference C indicates a third case where the read beam moves on a portion deviating from the track center axis towards the outer circle end of the optical disk. The RF signal obtained in the third case is indicated as $S_C$. The RF signal $S_C$ has a waveform reverse to that of the RF signal $S_B$.

It is assumed that SAMPLE ($T_1$) indicates a signal value obtained by performing signal sampling at the time of the wobble pit $P_{W1}$, and SAMPLE($T_2$) indicates a signal value obtained by performing signal sampling at the time of the wobble pit $P_{W2}$. The difference between the SAMPLE($T_1$) and the SAMPLE($T_2$), that is, SAMPLE($T_1$)−SAMPLE($T_2$) is equal to zero, a negative value and a positive value in the first, second and third cases A, B and C, respectively. Assuming that SAMPLE($T_1$)−SAMPLE($T_2$)=TE, the TE can be used as a tracking error signal.

In the above-mentioned conventional sampled servo method, the wobble pits $P_{W1}$ and $P_{W2}$ as well as the clock pit CP are per-formed on the optical disk (pre-pits), and a variety of information for use in servo control, such as a tracking error signal, is generated by the arrangement of these pits.

In the information reading operation, the laser beam reflected by the signal pit PT is also diffracted by the signal pit PT, and a small quantity of light returns to the optical pickup therefrom, so that the position of the signal pit PT is handled as a dark portion. On the other hand, the space between the signal pits PT has a mirror surface, and the laser beam is totally reflected by the mirror surface. Hence a large quantity of light returns to the optical pickup, and the corresponding portion is handled as a light portion. In order to correctly read servo information, it is necessary to read the above darkness and lightness without any error. In order to read darkness and lightness without error, conventionally, as shown in FIG. 4A, it is necessary to design a track pitch width $T_P$ (approximately 1.6 µm, for example) so that it is greater than the diameter $B_L$ of a spot formed by the laser beam.

In the above case, in order to improve the recording density of the optical disk DK, it may be considered to reduce the track pitch width. FIG. 4B or FIG. 4C shows the track pitch width $T_P$ reduced to a half (approximately 0.8

μm) of the conventional width. The difference becomes small between the quantity of light obtained in an on-track state shown in FIG. 4B, in which the center of the laser beam is located on the track center axis, and the quantity of light obtained in an off-track state shown in FIG. 4C, in which the center of the laser beam is located out of the track center axis, and hence the servo control cannot be correctly performed. As a result, it is impossible to reduce the track pitch width beyond a limited value. It may be considered to shorten the wavelength of the laser beam and diminish the size of the pits in order to improve the recording density of the optical disk DK. However, also in this case, there is a limit regarding the track pitch due to the spot diameter $B_L$. Further, it becomes difficult to record the wobble pits at high speed and high precision.

SUMMARY OF THE INVENTION

It is an object of the present invention to provide an optical disk, a tracking error signal generating apparatus and a tracking control apparatus, in which the tracking error signal can be easily generated in a state in which the track pitch becomes narrower than the diameter of a spot formed by a read laser beam, and tracking control can be easily performed, so that the recording density can be improved without high-precision wobble pits.

According to the present invention, the above mentioned object can be achieved by an optical disk including: a plurality of recording tracks, each of the recording tracks having a data area for storing data, and a servo control information area for storing servo information; and tracking pits respectively formed on n neighboring recording tracks, which are adjacent to each other in a radial direction of the optical disk, where n is an integer not less than 3. The tracking pits are located in the servo control information area of each of the n neighboring recording tracks and are spaced apart from each other by a distance not less than a radius of a beam spot for reading data from the optical disk. The tracking pits of the n neighboring recording tracks are located on different radial lines of the optical disk.

According to the present invention, the above object can be also achieved by a tracking error signal generating apparatus in an optical disc player, which generates main read beam for reading data recorded on one of tracks formed on the above described optical disk of the present invention, and two sub read beams for reading data recorded on two tracks adjacent to one of the tracks. The tracking error signal generating apparatus includes: a timing generating device for generating a plurality of sampling timings respectively corresponding to recording positions of the tracking pits for the main read beam and the two sub read beams; a sample and hold device for sampling reproduced signals respectively corresponding to the main read beam and the two sub read beams on the basis of the plurality of sampling timings and for holding the sampled reproduced signals; a comparing device for comparing levels of the sampled reproduced signals respectively corresponding to the plurality of sampling timings and for outputting a selecting signal indicating one of the sampling timings at which one of the sampled reproduced signals has a largest level; a selecting device for selectively outputting, from the sample and hold device, the sampled reproduced signals obtained from the two sub read beams at one of the sampling timings indicated by the selecting signal; and an operation device for outputting a tracking error signal on the basis of the sampled reproduced signals from the selecting device.

According to the present invention, the above mentioned object can be also achieved by a tracking control apparatus having the above described tracking error signal generating apparatus of the present invention, in an optical disc player, which generates main read beam for reading data recorded on one of tracks formed on the optical disk of the present invention, and two sub read beams for reading data recorded on two tracks adjacent to one of the tracks. The tracking control apparatus includes: a signal generating device for generating a pull-in tracking error signal from read signals of the tracking pits read by the two sub read beams at one of the sampling timings; and a pull-in device for pulling the main read beam in one of the recording tracks on the basis of the pull-in tracking error signal.

According to the present invention, the above mentioned object can be also achieved by another tracking control apparatus having the above described tracking error signal generating apparatus of the present invention, in an optical disc player, which generates main read beam for reading data recorded on one of tracks formed on the above described optical disk of the present invention, and two sub read beams for reading data recorded on two tracks adjacent to one of the tracks. The tracking control apparatus includes: a signal generating device for comparing levels of read signals of the main read beam, at respective read timings of the tracking pits formed on the adjacent recording tracks, with each other, selecting the read timing at which the level of read signal is larger, and generating a pull-in tracking error signal from the read signals of the two sub read beams at the selected read timing; and a pull-in device for pulling the main read beam in one of the recording tracks on the basis of the pull-in tracking error signal.

According to the present invention, the above mentioned object can be also achieved by another tracking error signal generating apparatus for generating a tracking error signal from read signals from the above described optical disk of the present invention. The tracking error signal generating apparatus includes: a read device for outputting read signals at a plurality of read timings corresponding to recording positions of the tracking pits by reading a recording track of interest by means of a read beam; a comparing device for comparing levels of the read signals respectively obtained at the read timings and for selecting one of the plurality of read timings at which one of the read signals has a largest level; and an operation device for selecting read timings at which the tracking pits formed on the recording tracks adjacent to the recording track of interest are read on the basis of the selected read timings selected by the comparing device and for generating the tracking error signal on the basis of the read signals corresponding to the selected read timings.

According to the present invention, the above mentioned object can be also achieved by another tracking control apparatus for performing tracking control of the above described optical disk of the present invention. The tracking control apparatus includes: a signal generating device for generating a tracking error signal on the basis of a read signal output by reading by means of a read beam at fixed one of read timings at the time of counting recording tracks; and a count device for counting a number of tracks by a unit of cycle of recording positions of the tracking pits on the basis of the tracking error signal.

According to one aspect of the present invention, tracking pits are respectively formed on n recording tracks adjacent to each other in a radial direction of an optical disk, where n is an integer equal to or greater than 3. The tracking pits are located in a servo control information area of each of the n recording tracks and are spaced apart from each other by a distance equal to at least a radius of a beam spot for reading data from the optical disk. The tracking pits are located on different radial lines of the optical disk. Hence, in tracking control, there is no interference of waveforms from adjacent recording tracks, and there is no need to provide wobble pits. Hence it becomes possible to perform tracking control of a fine track pitch and increase the recording density.

According to another aspect of the present invention, timing generating means generates a plurality of sampling timings respectively corresponding to recording positions of the tracking pits for the main read beam and the two sub read beams. Sample and hold means samples reproduced signals respectively corresponding to the main read beam and the two sub read beams on the basis of the plurality of sampling timings and holds sampled reproduced signals. Comparing means compares levels of the sampled reproduced signals respectively corresponding to the plurality of sampling timings and generates a selecting signal for outputting a selecting signal indicating one of the sampling timings at which one of the sampled reproduced signals having a largest level is obtained. Selecting means selectively outputs, from the sample and hold means, the sampled reproduced signals obtained from the two sub read beams at the one of the sampling timings indicated by the selecting signal. Operation means outputs the tracking error signal on the basis of the sampled reproduced signals selectively output by the selecting means. Hence, it is possible to record information with a high recording density and to easily and certainly generate the tracking error signal even when the tracking pitch is narrow.

Yet another aspect of the present invention, pull-in means generates a pull-in tracking error signal from read signals of the tracking pits read by the two sub read beams at one of the sampling timings and pulls the main read beam in one of the recording tracks on the basis of the pull-in tracking error signal. Hence, it is also possible to increase the controllable pull-in range using the tracking error signal even for a reduced track pitch and to stably pull the read beam in a track.

A further aspect of the present invention, pull-in means compares levels of read signals obtained by reading the tracking pits formed on the two adjacent recording tracks at respective read timings with each other, generates a pull-in tracking error signal from the read signals, and pulls the main read beam in one of the recording tracks on the basis of the pull-in tracking error signal. Hence, it is also possible to increase the controllable pull-in range using the tracking error signal even for a reduced track pitch and to stably pull the read beam in a track.

A still further aspect of the present invention, read means outputs the read signals at a plurality of read timings corresponding to recording positions of the tracking pits by reading a recording track of interest by means of a read beam. Comparing means compares levels of the read signals respectively obtained at the read timings and selects one of the plurality of read timings at which one of the read signals having a largest level. Operation means selects the read timings at which the tracking pits formed on the recording tracks adjacent to the recording track of interest are read at selected read timings, and generates the tracking error signal on the basis of the read signals corresponding to the selected read timings. Hence, it is possible to record information with a high recording density and to easily and certainly generate the tracking error signal even when the tracking pitch is narrow.

Furthermore, according to the present invention, count means generates a tracking error signal on the basis of a read signal output by reading by means of a read beam at a fixed one of read timings at the time of counting recording tracks, and counts a number of tracks with a period of recording positions of the tracking pits on the basis of the tracking error signal. Hence, it is possible to count the number of recording tracks even when recording tracks are crossed.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIGS. 10A and 10B are diagrams showing the operation of the first embodiment of the present invention;

FIG. 11 is a waveform diagram of a tracking error signal;

FIG. 15 is a diagram of a timing selecting table.

DESCRIPTION OF THE PREFERRED EMBODIMENTS

A description will now be given of preferred embodiments of the present invention.

First Embodiment

Figure 1:
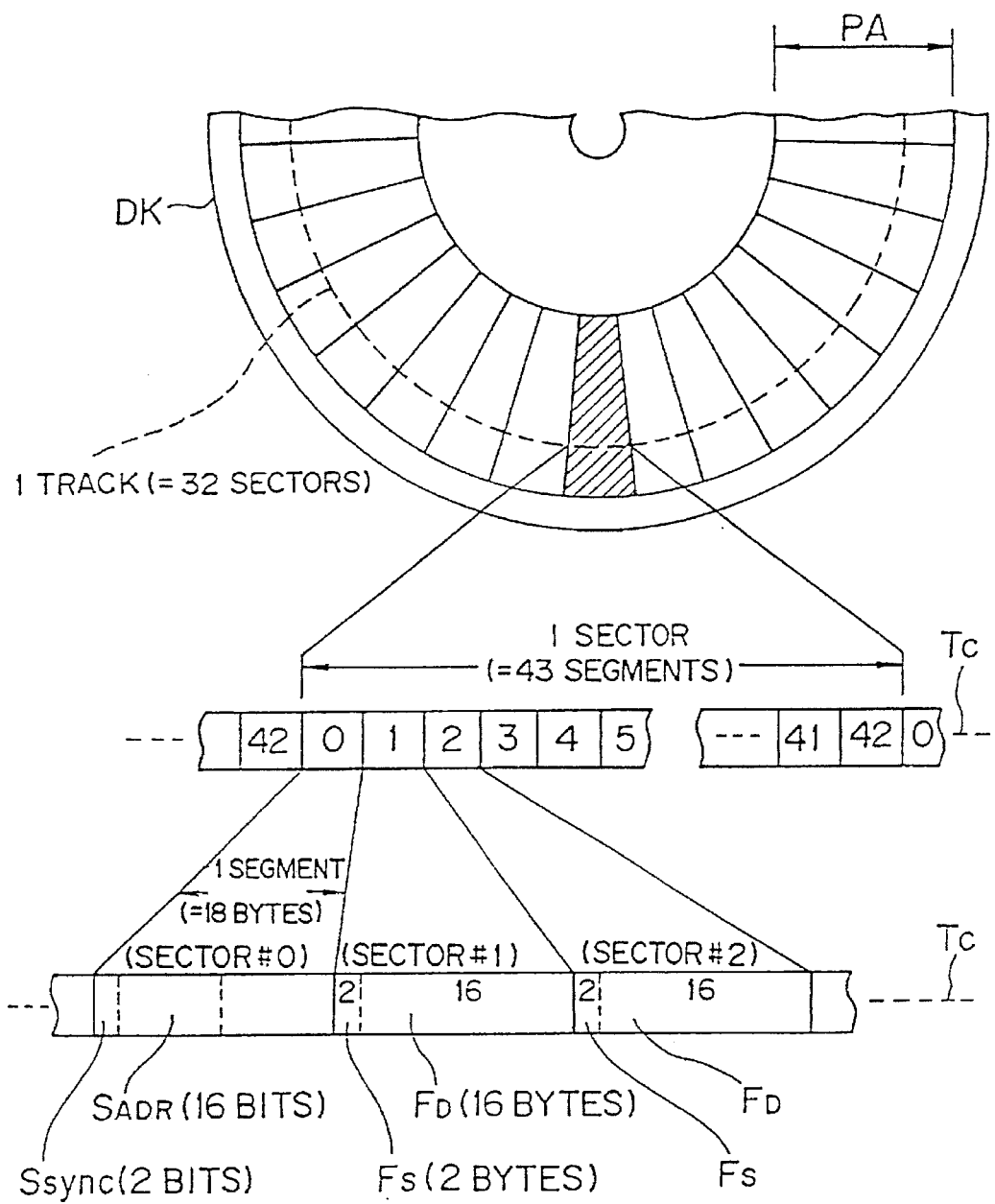
FIG. 1 is a diagram illustrating a recording format of a sampled servo method.
Figure 2:
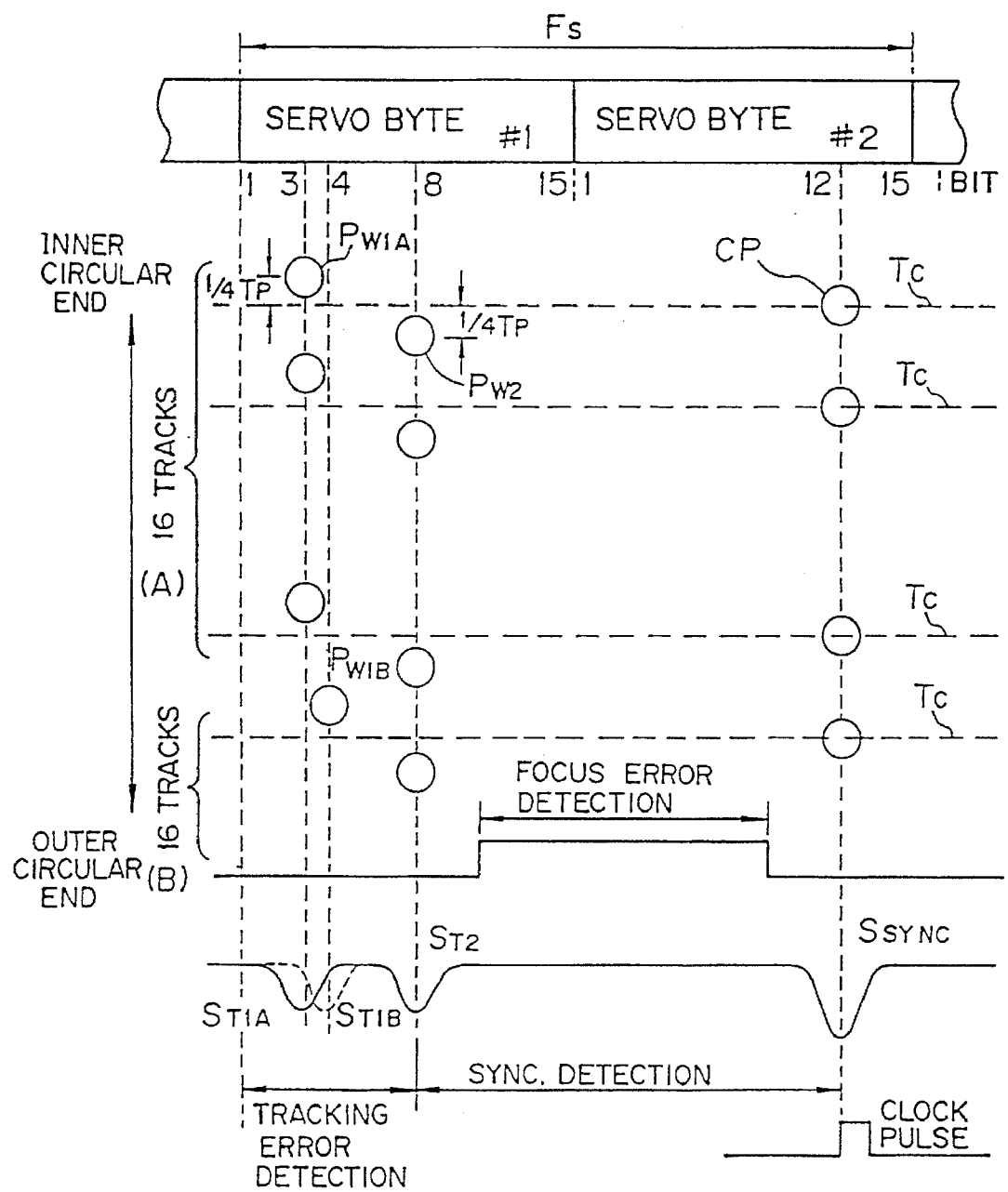
FIG. 2 is a diagram of a recording format of a conventional servo area.
Figure 3:
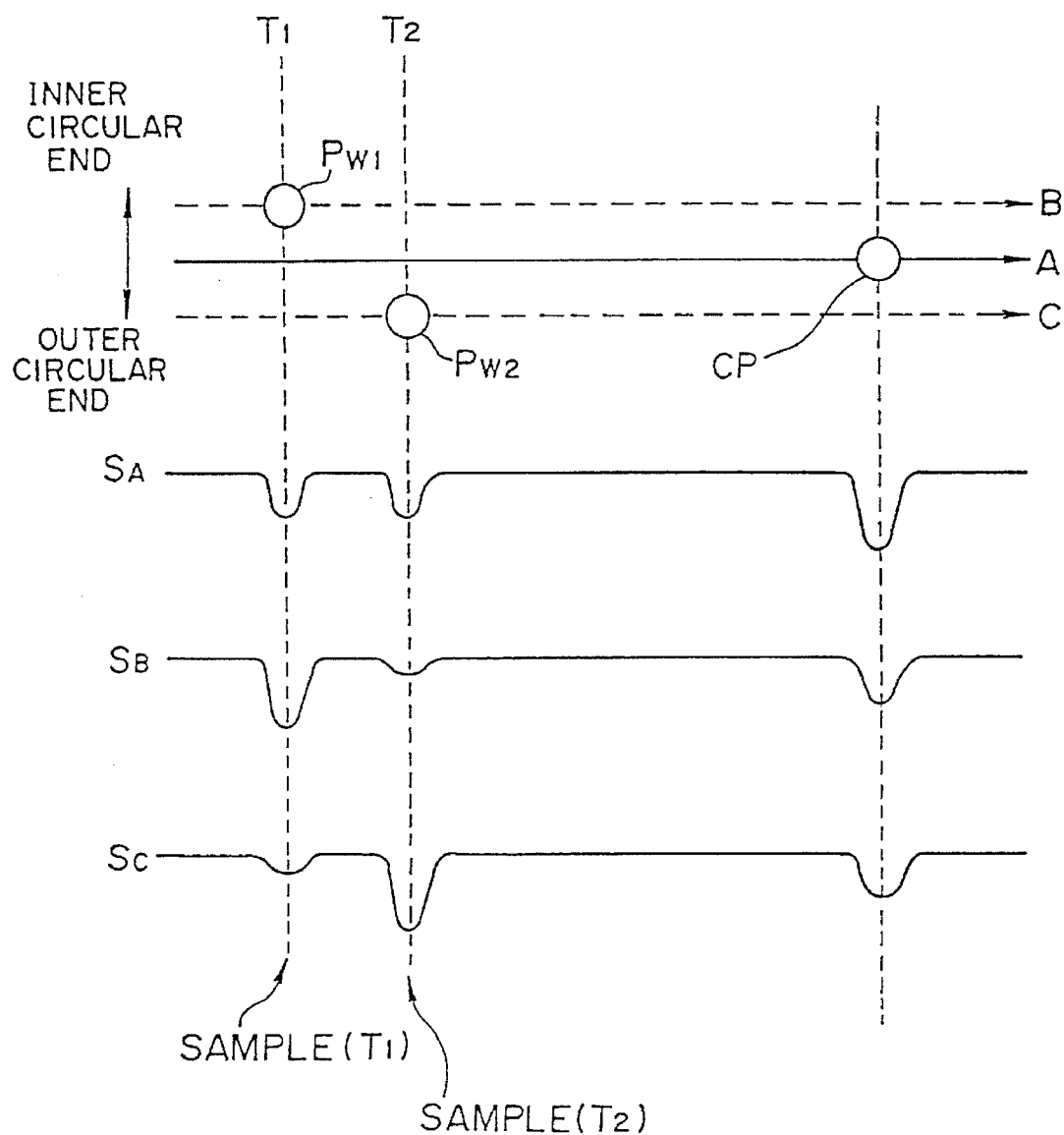
FIG. 3 is a waveform diagram illustrating detection of a tracking error by means of conventional wobble pits.
Figure 4A:
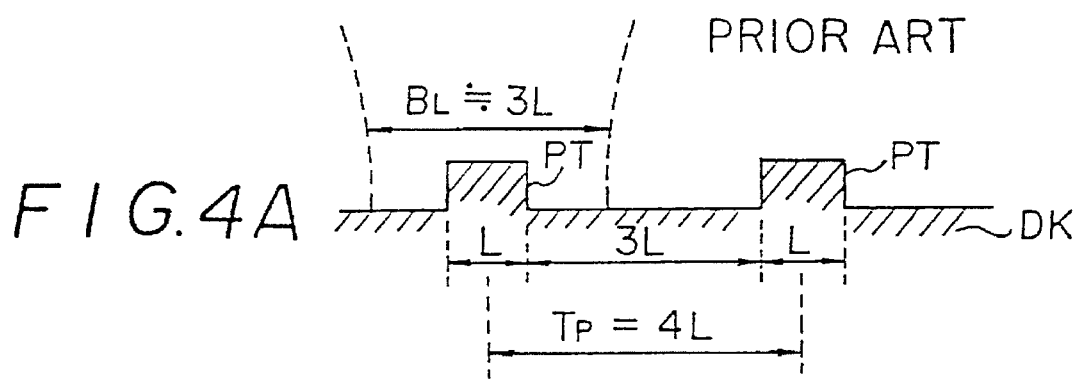
FIGS. 4A, 4B and 4C are respectively diagrams illustrating disadvantages of the conventional art.
Figure 4B:
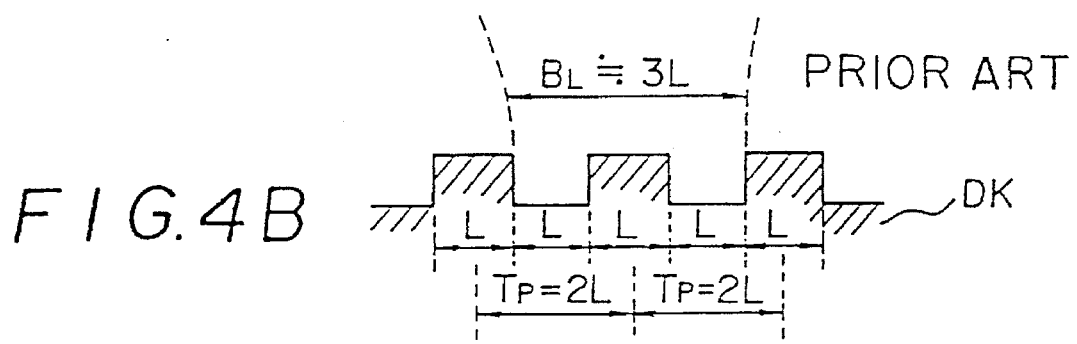
Figure 4C:
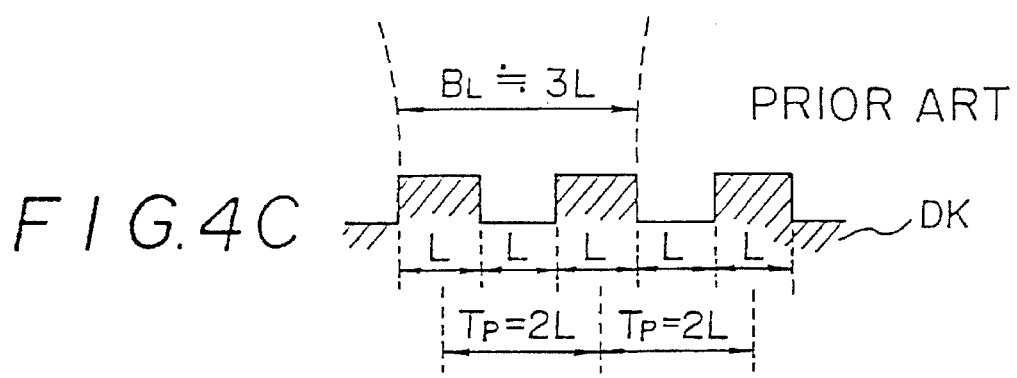
Figure 5:
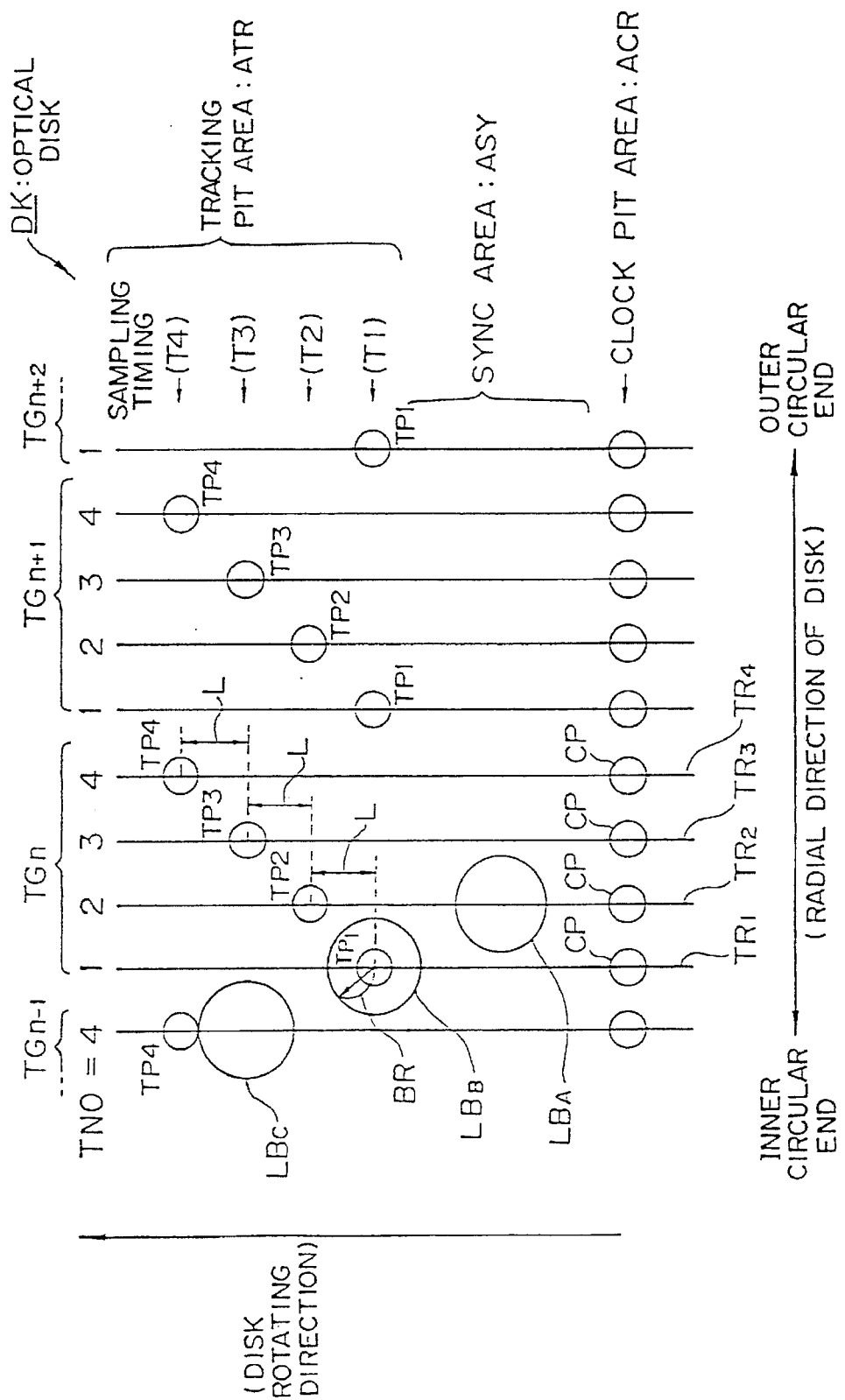
FIG. 5 is a diagram of a recording format of an optical disk.

FIG. 5 shows a recording format of an optical disk according to a first embodiment of the present invention. In the following description, a group of four neighboring recording tracks defines a cycle of the recording positions of tracking pits.

FIG. 5 shows a part of the optical disk, and more particularly shows recording track groups $TG_{n-1}$, $TG_n$, $TG_{n-1}$ and $TG_{n+2}$, each group consisting of four neighboring recording tracks. The following description mainly relates to the recording track group $TG_n$.

Each of recording tracks $TR_1$ to $TR_4$ (track numbers TNO=1 to 4) forming the recording track Group $TG_n$ is provided with a tracking pit area ATR, a sync (SYNC) area ASY and a clock pit area ACR arranged in this order from the head of the arrow indicating the disk rotating direction (upper side of the drawing). A data area (not shown) used to record a variety of data is provided on the lower side of the drawing.

The tracking pit area ATR has four tracking pits respectively located at different positions (i.e. on different radial lines) on the recording tracks $TR_1$ to $TR_4$.

In the clock pit area ACR, clock pits CP are respectively provided for the recording tracks $TR_1$ to $TR_4$ so that the clock pits CP are arranged in a line in the radial direction of the optical disk (i.e. on a same radial line). The clock pits CP indicate the clock generating timing.

More concretely, the recording track $TR_1$ is provided with a tracking pit $TP_1$ located at a position corresponding to the center of a read beam $LB_B$ obtained prior, by time $T_1$ (sampling timing), to a reference time at which the clock pit CP is read by the read beam $LB_B$ (or a read beam $LB_A$ or a read beam $LB_C$) while the optical disk is being rotated at a regular velocity.

The recording track $TR_2$ is provided with a tracking pit $TP_2$ located at a position which is further away from the center of the tracking pit $TP_1$ by a distance L in the circular direction (i.e. disk rotating direction) of the optical disk DK. The sampling timing is time $T_2$ at the above position. The distance L is selected so as to be equal to or greater than a radius BR of the beam spot of the read beam $LB_B$ (or the read beam $LB_A$ or the read beam $LB_C$), that is to say, BR≤L. The track pitch width is approximately equal to the radius of the spot of the read beam.

Similarly, the recording track $TR_3$ is provided with a tracking pit $TR_3$ located at a position which is further away from the center of the tracking pit $TP_1$ by a distance 2L (equal to twice the length L) in the circular direction of the optical disk DK. The sampling timing is time $T_3$ at the above position. The recording track $TR_4$ is provided with a tracking pit $TR_4$ located at a position which is further away from the center of the tracking pit $TP_1$ by a distance 3L in the circular direction of the optical disk DK. The sampling timing for the above position is time $T_4$.

Further, each of the other track groups (. . . , $TG_{n-1}$, $TG_{n+1}$, $TG_{n+2}$, . . . ) is provided with the same tracking pit arrangement as the recording track group $TG_n$.

Figure 6:
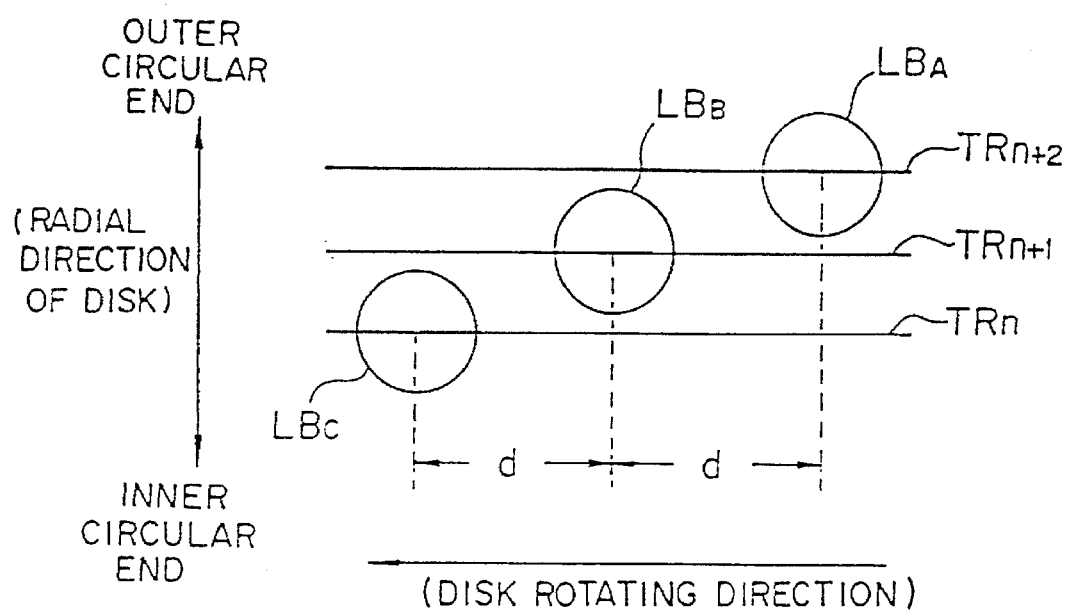
FIG. 6 is a diagram of a positional relationship between read beams.

A description will now be given, with reference to FIG. 6, of the mutual relationship of the read beam projecting positions.

The three read beams $LB_A$, $LB_B$ and $LB_C$ are arranged so as to be spaced apart from each other (offset) in the circular direction of the optical disk DK by a beam-center-to-beam-center position d, so that the three read beams can be separated from each other on not-shown photodetectors. Such an offset arrangement of the read beams is due to the fact that the radius of the spots of the read beams $LB_A$, $LB_B$ and $LB_C$ are approximately equal to the track pitch so that, if the read beams $LB_A$, $LB_B$ and $LB_C$ are arranged in a line in the radial direction of the optical disk DK, these beams will overlap and will not be able to be separated from each other on the photodetectors. Due to the above-mentioned offset arrangement, output signals derived from the three read beams $LB_A$, $LB_B$ and $LB_C$ have a delay $T_d$ of time described by the following equation:

$$T_d = d/V_c$$

where $V_c$ denotes a linear velocity of the center of the read beam with respect to the optical disk DK.

With the above in mind, it is necessary to simultaneously output the above output signals respectively corresponding to the read beams $LB_A$, $LB_B$ and $LB_C$ and to thereby process the output signals as if the read signals from positions substantially located in the same radial direction were simultaneously processed. Read timings of the photodetectors related to the read beams $LB_A$, $LB_B$ and $LB_C$ are controlled by performing a correction operation with a delay time Td, on a synchronizing clock used for the output signal of the not-shown photodetector relating to the read beam $LB_B$. In the above manner, the delay time $T_d$ can be compensated for, when the delay time $T_d$ is equal to an integer multiple of the cycle of the synchronizing clock used for the output signal of the not-shown photodetector associated with the read beam $LB_B$.

It is also possible to employ the above-mentioned offset arrangement with respect to pits for tracking. More particularly, the recording position of the clock pit CP is used as the reference position, and the tracking pits are arranged at positions which are offset by a time equal to an integer multiple of the period of the clock for synchronization. The read timings at which the clock pits are read by the respective read beams $LB_A$, $LB_B$ and $LB_C$ with respect to the clock pits CP are used as reference timings, and are generated at times corresponding to an integer multiple of the period of the clock for synchronization.

Figure 7:
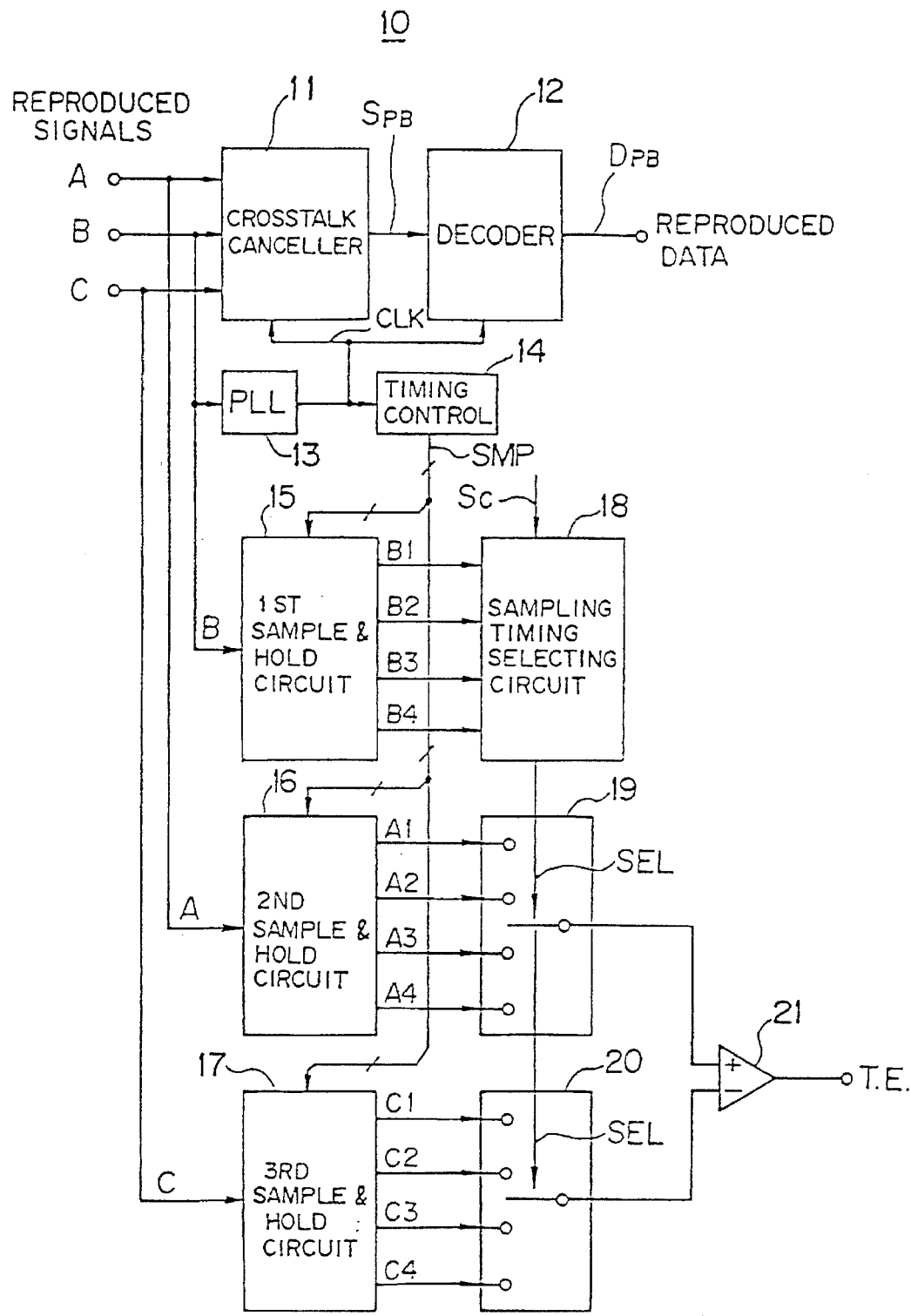
FIG. 7 is a block diagram of an essential part of a reproducing apparatus according to a first embodiment of the present invention.

A description will now be given, with reference to FIG. 7, of an essential part of the reproducing apparatus to generate a tracking error signal.

The reproducing apparatus 10 is made up of a crosstalk canceller 11, a decoder 12, a PLL circuit 13, a timing control circuit 14, a first sample and hold circuit 15, a second sample and hold circuit 16, a third sample and hold circuit 17, a sampling timing selecting circuit 18, a first selecting circuit 19, a second selecting circuit 20 and a subtracter 21.

The crosstalk canceller 11 cancels crosstalk components from reproduced signals A, B and C (RF signals) respectively derived from the three read beams $LB_A$, $LB_B$ and $LB_C$ on the basis of a clock signal CLK input to the crosstalk canceller 11, and hence output a reproduced signal $S_{PB}$. The decoder 12 decodes the reproduced signal $S_{PB}$ and hence outputs reproduced data $D_{PB}$. The PLL circuit 13 generates the clock signal CLK on the basis of the reproduced signal B derived from the read beam $LB_B$ that is the main beam. The timing control circuit 14 outputs a sampling timing signal SMP on the basis of the clock signal CLK. The first sample and hold circuit 15 samples the reproduced signal B at the respective sampling timings $T_1$ to $T_4$ on the basis of the sampling timing signal SMP, and holds sampled components of the reproduced signal B, that is, sampled signals $B_1$ to $B_4$ to output them. The second sample and hold circuit 16 samples the reproduced signal A at the respective sampling timings $T_1$ to $T_4$ on the basis of the sampling timing signal SMP, and holds sampled components of the reproduced signal B, that is, sampled signals $A_1$ to $A_4$ to output them. The third sample and hold circuit 17 samples the reproduced signal C at the respective sampling timings $T_1$ to $T_4$ on the basis of the sampling timing signal SMP, and holds sampled components of the reproduced signal C, that is, sampled signals $C_1$ to $C_4$ to output them. The sampling timing selecting circuit 18 outputs a sampling timing selecting signal SEL on the basis of the sampled signals $B_1$ to $B_4$ and a control signal from a not-shown controller. The first selecting circuit 19 selects one of the sampled signals $A_1$ to $A_4$ on the basis of the sampling timing selecting signal SEL. The second selecting circuit 20 selects one of the sampled signals $C_1$ to $C_4$ on the basis of the sampling timing selecting signal SEL. The subtracter 21 calculates the difference between the sampled signal from the first selecting circuit 19 and the sampled signal from the second selecting circuit 20, and outputs the difference as a tracking error signal TE.

Figure 8:
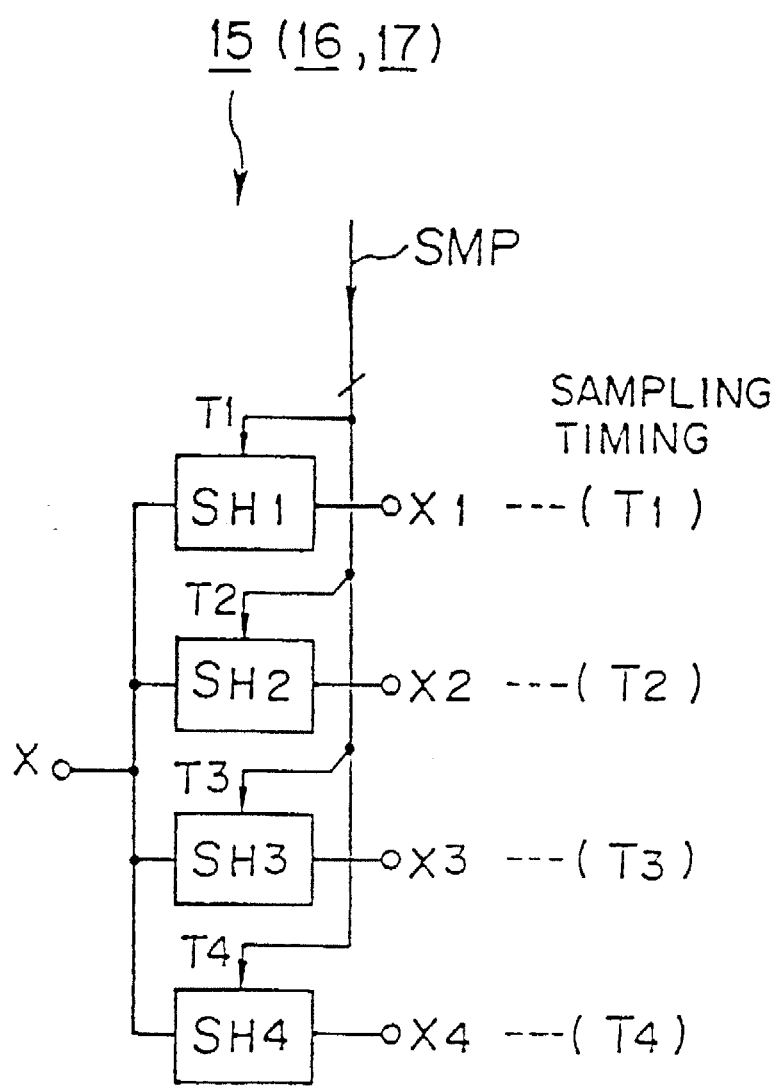
FIG. 8 is a block diagram of a detailed structure of a sample and hold circuit.

A description will now be given, with reference to FIG. 8, of the sample and hold circuits 15 to 17.

The first sample and hold circuit 15, the second sample and hold circuit 16 and the third sample and hold circuit 17 have the same structure as each other. Each of the circuits 15 to 17 is made up of a first sample and hold part $SH_1$, a second sample and hold part $SH_2$, a third sample and hold part $SH_3$, and a fourth sample and hold part $SH_4$. The first sample and hold part $SH_1$ samples and holds the input reproduced signal (A, B or C) at the sampling timing $T_1$ based on the sampling timing signal SMP. The second sample and hold part $SH_2$ samples and holds the input reproduced signal (A, B or C) at the sampling timing $T_2$ based on the sampling timing signal SMP. The third sample and hold part $SH_3$ samples and holds the input reproduced signal (A, B or C) at the sampling timing $T_3$ based on the sampling timing signal SMP. The fourth sample and hold part $SH_4$ samples and holds the input reproduced signal (A, B or C) at the sampling timing $T_4$ based on the sampling timing signal SMP.

A description will now be given, with reference to FIGS. 9A, 9B, 10A, 10B and 11, of a tracking error signal generating operation. In the following description, as shown in FIG. 9A, the read beam $LB_B$ traces the recording track $TR_1$.

i) Case where the read beam is located on the center line of the recording track $TR_1$ (on-track state):

Each of the reproduced signals A, B and C are sampled at timings corresponding to the recording positions $TP_m$ (m=1 to 4) in synchronism with the sampling timing signal SMP. More concretely, the reproduced signal A is sampled at the sampling timings $T_1, \ldots, T_4$ by means of the second sample and hold circuit 16. Similarly, the reproduced signal B is sampled at the sampling timings $T_1, \ldots, T_4$ by means of the first sample and hold circuit 15 before the clock pit CP is detected by the read beam $LB_B$. The reproduced signal C is sampled at the sampling timings $T_1, \ldots, T_4$ by means of the third sample and hold circuit 17 before the clock pit CP is detected by the read beam $LB_C$. Hence, 12 (=3×4) pieces of sampled data are obtained in the above-mentioned case.

Figures 9A, 9B:
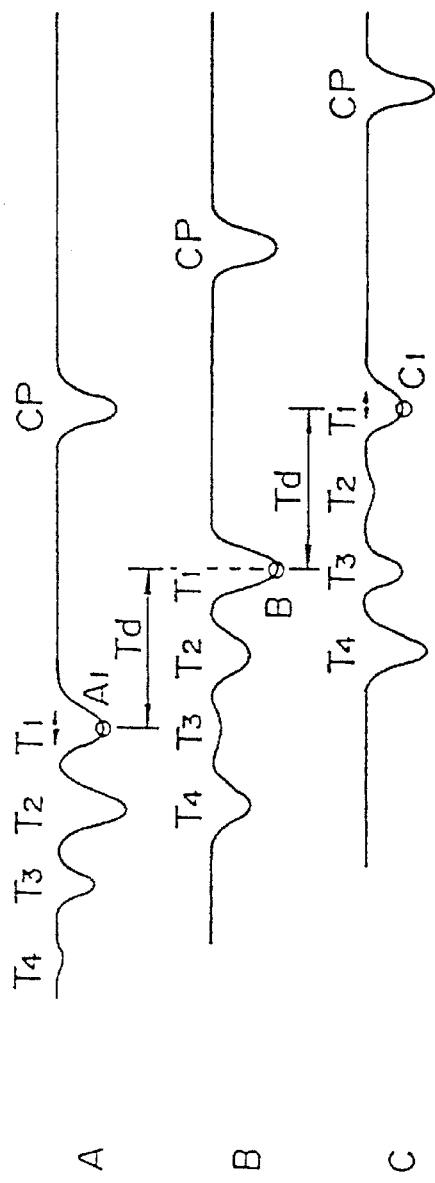
FIGS. 9A and 9B are diagrams showing the operation of the first embodiment of the present invention.

The waveforms of the reproduced signals A, B and C before and after sampling are shown in FIG. 9B. In the reproduced signal A, since the track pitch is narrow, the tracking pit located on the neighboring recording track is detected. Hence, the sampled reproduced signal A has signal components corresponding to not only the tracking pit $TP_2$ but also the tracking pits $TP_3$ and the tracking pit $TP_1$. In this case, when the levels (degree of darkness of the dark portion) of the sampled signals are compared with each other, the following will be seen. That is, the sampled signal (sampled at sampling timing $T_2$) has the greatest peak (darkest). The levels of the sampled signals corresponding to the tracking pits $TP_3$ and $TP_1$, which are approximately equal to each other, are less than the level of the sampled signal derived from the tracking pit $TP_2$. The peak of the reproduced signal A derived from the tracking pit $TP_4$ is the smallest.

When the levels of the sampled signals of the reproduced signal B are compared with each other, the following will be seen. That is, the sampled signal (sampled at sampling timing $T_1$) has the greatest peak (darkest). The levels of the sampled signals corresponding to the tracking pits $TP_4$ and $TP_2$, which are approximately equal to each other, are less than the level of the sampled signal derived from the tracking pit $TP_1$. The peak of the reproduced signal A derived from the tracking pit $TP_3$ is the smallest.

When the levels of the sampled signals of the reproduced signal C are compared with each other, the following will be seen. That is, the sampled signal (sampled at sampling timing $T_4$) has the greatest peak (darkest). The levels of the sampled signals corresponding to the tracking pits $TP_3$ and $TP_1$, which are approximately equal to each other, are less than the level of the sampled signal derived from the tracking pit $TP_4$. The peak of the reproduced signal A derived from the tracking pit $TP_2$ is the smallest.

Next, the sampling timing selecting circuit 18 compares the four sampled values of the reproduced signal B (more particularly, sampled signals $B_1$ to $B_4$: see FIG. 9B) derived from the read beam $LB_B$ that is the main beam with each other, and identifies the tracking pit on the recording track which is being traced by the read beam $LB_B$. In the above case, the reading peak of the tracking pit $TP_1$ is the greatest peak, and hence the tracking pit on the recording track $TR_1$ traced by the read beam $LB_B$ is identified as the tracking pit $TP_1$.

Subsequently, the sampling timing selecting circuit 18 provides the first selecting circuit 19 and the second selecting circuit 20 with the sampling timing selecting signal SEL used to select the sampled signal sampled at the same sampling timing as the sampling timing $T_1$ of the tracking pit $TP_1$ that is the tracking pit on the recording track traced by the read beam $LB_B$.

As a result, the first selecting circuit 19 selects the sampled signal $A_1$, and the second selecting circuit 20 selects the sampled signal $C_1$. These selected signals are output to the subtracter 21. The subtracter 21 generates the tracking error signal TE by using the following equation (1) and outputs it:

$$TE = A_1 - C_1.$$

In this case, if the read beam $LB_B$ is located on the recording track $TR_1$ (on-track state), the read peak of the sampled signal $A_1$ and the read peak of the sampled signal $C_1$ are equal to each other, and the tracking error TE is equal to 0.

A description will now be given of an operation in which the read beam $LB_B$ is off the center line of the recording track.

ii) Case where the read beam $LB_B$ is off towards the recording track $TR_2$:

FIG. 10A shows waveforms of the reproduced signals A and C observed when the read beam $LB_B$ is off towards the recording track $TR_2$. FIG. 10A differs from FIG. 9B in that the condition where the correction operation for compensating for the delay time $T_d$ has been performed, is shown.

As compared to the on-track state (see FIG. 9B), the sampled signal $A_1$ of the reproduced signal A has a small read peak, while the sampled signal $C_1$ of the sampled signal C has a large read peak (see FIG. 9B). Hence, the tracking error signal TE is written as follows:

$$TE = A_1 - C_1 < 0$$

Hence, it is possible to detect a deviation of the read beam $LB_B$ towards the recording track $TR_2$ and the degree of such a deviation.

iii) Case where the read beam $LB_B$ is off towards a recording track $TR_4$':

FIG. 10B shows waveforms of the reproduced signals A and C observed when the read beam $LB_B$ is off towards the recording track $TR_4'$ in which the condition where the correction operation for compensating for the delay time $T_d$ has been performed, is shown.

As compared to the on-track state (see FIG. 9B), the sampled signal $A_1$ of the reproduced signal A has a large read peak, while the sampled signal $C_1$ of the reproduced signal C has a small peak (see FIG. 9B). Hence, the tracking error signal TE is written as follows:

$$TE = A_1 - C_1 > 0$$

Hence, it is possible to detect a deviation of the read beam $LB_B$ towards the recording track $TR_4'$ and the degree of such a deviation.

FIG. 11 shows concrete examples of the tracking error signal TE. As shown in FIG. 11, the tracking error signal TE is a signal obtained by combining the first through fourth tracking error signals $TE_1$ to $TE_4$ obtained at the sampling timings $T_1$ to $T_4$ together. More concretely, when data is reproduced from the recording track assigned track number TNO=1, the first tracking signal $TE_1$ (=$A_1$–$C_1$) is used as the tracking error signal TE. When data is reproduced from the recording track assigned track number TNO=2, the second tracking signal $TE_2$ (=$A_2$–$C_2$) is used as the tracking error signal TE. When data is reproduced from the recording track assigned track number TNO=3, the third tracking signal $TE_3$ (=$A_3$–$C_3$) is used as the tracking error signal TE. When data is reproduced from the recording track assigned track number TNO=4, the fourth tracking signal $TE_4$ (=$A_4$–$C_4$) is used as the tracking error signal TE. FIG. 11 integrally illustrates the above tracking error signals $TE_1$ to $TE_4$.

As has been described above, according to the first embodiment of the present invention, there is only one tracking pit every four tracks at a sampling timing even in the case where the track pitch is diminished in order to improve the recording density. Hence, there is no influence of the neighboring tracks, and it is possible to easily and certainly generate the tracking error signal by means of the three beam method by using three read beams each having the same size as that of the read beams which are conventionally used. Further, it is possible to simplify the structure of the recording apparatus because it is not necessary to provide any wobble pits.

One Modification of the First Embodiment

In the first embodiment of the present invention, by performing the tracking servo by use of one of the first through fourth tracking error signals $TE_1$ to $TE_4$ shown in FIG. 11, that is, by performing the tracking servo by use of a constant sampling timing, the recording track to be pulled in, becomes different depending upon the constant sampling timing. Using the above, it is possible to perform a track jump operation. A further description will now be given of a case in which the read beam $LB_B$ that is the main beam is jumped from the recording track $TR_2$ to the recording track $TR_4$ (see FIG. 5). First of all, the tracking error signal $TE_3$ is generated at the sampling timing $T_3$ corresponding to the recording track $TR_3$ adjacent, in the direction of the jump, to the recording track $TR_2$, which is being read by the read beam $LB_B$. Immediately before pulling it in the recording track $TR_3$, the tracking signal $TE_4$ is generated at a sampling timing corresponding to the recording track $TR_4$ adjacent, in the jump direction, to the recording track $TR_3$ so as to pull it in the recording track $TR_4$. By sequentially switching the sampling timings in the above manner, it becomes possible to easily perform the track jump control.

Another Modification of the First Embodiment

In the case where the tracking pits are arranged according to the first embodiment of the present invention, by paying attention to the sampling timing of a tracking pit, it is possible to count the number of recording tracks crossed in the track jump operation, by a unit of four recording tracks. For example, if the sampling timing of interest is the sampling timing $T_1$ for the tracking pit $TP_1$, the recording track ($TR_1$) synchronized with the sampling timing $T_1$ appears every four recording tracks. Hence, it is possible to count the number of recording tracks every four recording tracks. In this case, three recording tracks or less can be counted by checking the positions of the tracking pits.

Second Embodiment

The description has been given of the operation of the first embodiment after pulling the read beam in a recording track. The tracking controllable range is approximately equal to ½ of the track pitch (P) when the tracking error signal TE (see FIG. 11) generated in the first embodiment is used to pull the read beam in a recording track.

Meanwhile, the tracking pull-in possible range is approximately equal to one track pitch (P) by fixing the sampling timing as shown in FIG. 11. Hence, the read beam can be more easily pulled in a recording track by means of the constant sampling timing, as compared with the first embodiment.

With the above in mind, the tracking error signals ($TE_1$, ..., $TE_4$) are generated at the constant sampling timing when the read beam is pulled in. After the read beam has been pulled in, the sampling timings are switched and the tracking servo is performed by using the normal tracking error signals. In this manner, the read beam can be more stably pulled in. The above method is particularly effective to a high-speed searching operation.

Third Embodiment

The sampling timing signal applied to the second sample and hold circuit 16 and the third sample and hold circuit 17 is generated by a set of PLL circuit and timing control circuit commonly used for these circuits 16 and 17. In the third embodiment, sampling timing signals are generated for the respective sample and hold circuits.

Figure 12:
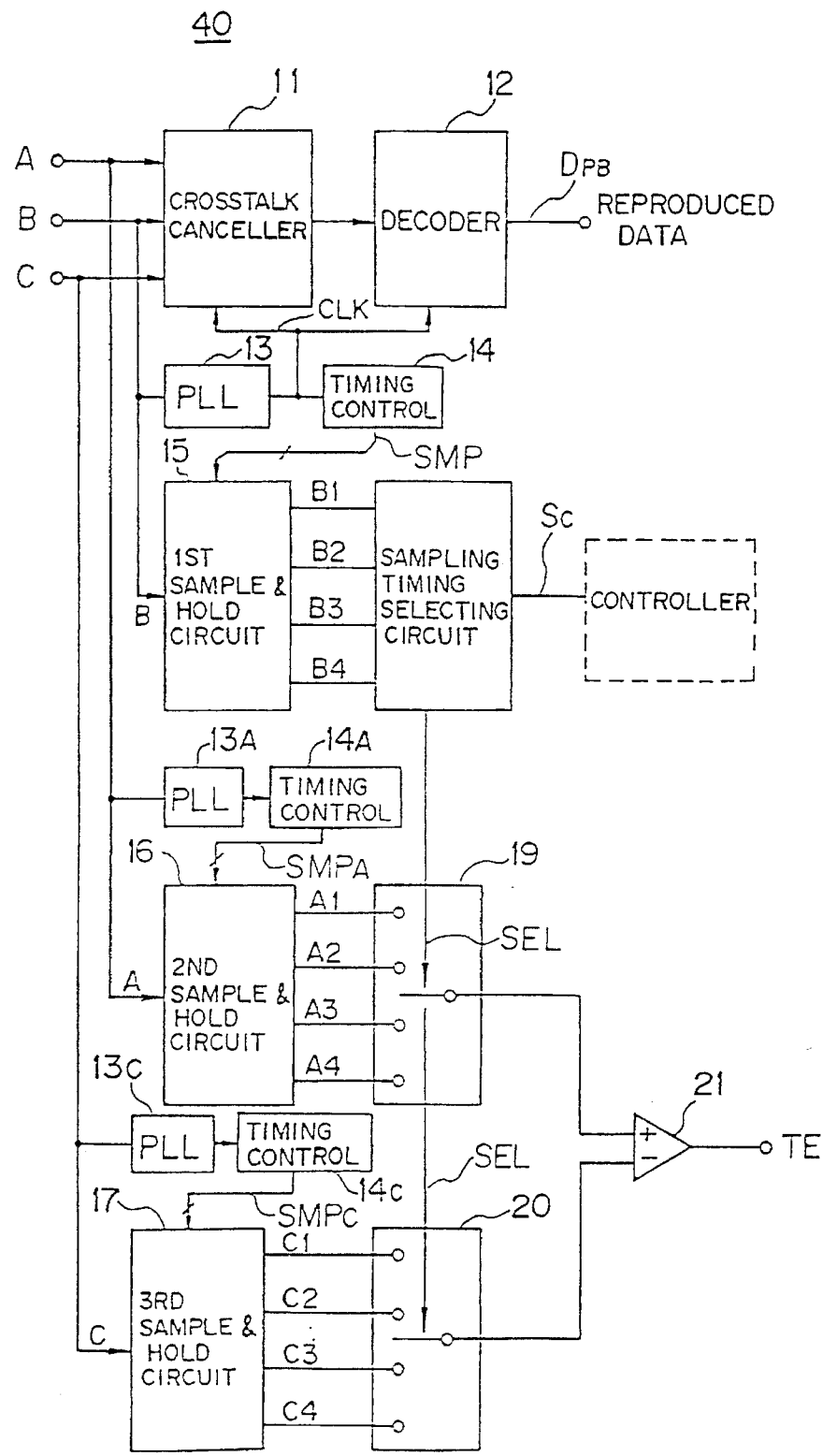
FIG. 12 is a block diagram of an essential part of a reproducing apparatus according to a second embodiment of the present invention.

FIG. 12 is a block diagram of a reproducing apparatus 40 according to the third embodiment. In FIG. 12, parts that are the same as parts used in the first embodiment shown in FIG. 7 are given the same reference numbers, and a detailed description thereof will be omitted. The third embodiment differs from the first embodiment in that the third embodiment includes a PLL circuit $13_A$, a timing control circuit $14_A$, a PLL circuit $13_C$ and a timing control circuit $14_C$. The PLL circuit $13_A$ generates a clock signal on the basis of the reproduced signal A and outputs the clock signal. The timing control circuit $14_A$ outputs a sampling timing signal SMPA applied to the second sample and hold circuit 16 on the basis of the clock signal generated by the PLL circuit $13_A$. The PLL circuit $13_C$ generates a clock signal on the basis of the reproduced signal C. The timing control circuit $14_C$ outputs a sampling timing signal SMPC applied to the third sample and hold circuit 17 on the basis of the clock signal generated by the PLL circuit $13_C$.

As a result, the second sample and hold circuit 16 and the third sample and hold circuit 17 performs the sample and hold operations with the respective timings. Hence, it is possible to prevent a deviation between the reading position defined by the sampling timing based on the sampling signal SMP and the actual recording position of the tracking pit and to obtain the more accurate tracking error signal TE, such a deviation being caused by fluctuation in rotation of the optical disk.

Fourth Embodiment

The fourth embodiment uses the optical disk used in the first embodiment, and is adapted such that the tracking signal is generated in the same manner as the conventional sampled servo method, by regarding the tracking pits formed on the respective recording tracks as wobble pits of an optical disk of the conventional sampled servo method. In this case, the fourth embodiment differs from the conventional sampled servo manner in that the positions of the wobble pits (equivalent to the tracking pits) are different from each other for each recording track to be traced, and the sampling timing is switched every recording track.

Figure 13:
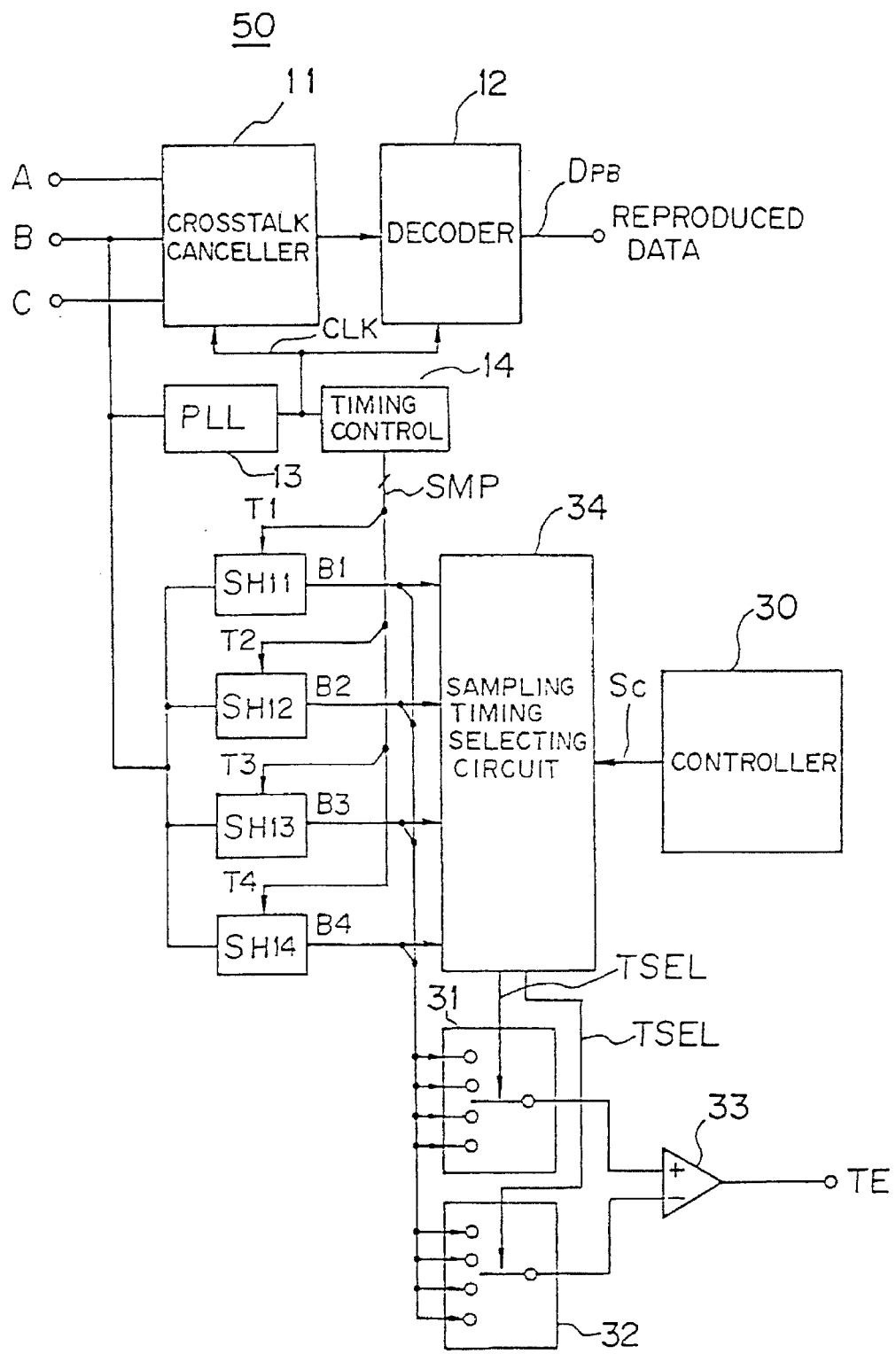
FIG. 13 is a block diagram of an essential part of a reproducing apparatus according to a third embodiment of the present invention.

A description will now be given of an essential part of a reproducing apparatus 50 according to the fourth embodiment of the present invention, with reference to FIG. 13.

The reproduced apparatus 50 is made up of the crosstalk canceller 11, the decoder 12, the PLL circuit 13, the timing control circuit 14, a first sample and hold part $SH_{11}$, a second sample and hold part $SH_{12}$, a third sample and hold part $SH_{13}$, a fourth sample and hold part $SH_{14}$, a timing selecting circuit 34, a first selecting circuit 31, a second selecting circuit 32, and a subtracter 33.

The crosstalk canceller 11 cancels crosstalk components from reproduced signals A, B and C (RF signals) respectively derived from the three read beams $LB_A$, $LB_B$ and $LB_C$ on the basis of the clock signal CLK input to the crosstalk cancellet 11, to output the reproduced signal $S_{PB}$. The decoder 12 decodes the reproduced signal $S_{PB}$ and hence outputs reproduced data $D_{PB}$. The PLL circuit 13 generates the clock signal CLK on the basis of the reproduced signal B derived from the read beam $LB_B$ that is the main beam. The timing control circuit 14 outputs the sampling timing signal SMP on the basis of the clock signal CLK. The first sample and hold circuit $SH_{11}$ samples the reproduced signal B at the sampling timing $T_1$ on the basis of the sampling timing signal SMP, and holds a sampled signal $B_1$ of the reproduced signal B. The second sample and hold circuit $SH_{12}$ samples the reproduced signal B at the sampling timing $T_2$ on the basis of the sampling timing signal SMP, and holds a sampled signal $B_2$ of the reproduced signal B. The third sample and hold circuit $SH_{13}$ samples the reproduced signal B at the sampling timing $T_3$ on the basis of the sampling timing signal SMP, and holds a sampled signal $B_3$ of the reproduced signal B. The fourth sample and hold circuit $SH_{14}$ samples the reproduced signal B at the sampling timing $T_4$ on the basis of the sampling timing signal SMP, and holds a sampled signal $B_4$ of the reproduced signal B. The sampling timing selecting circuit 34 outputs a sampling timing selecting signal TSEL on the basis of the sampled signals $B_1$ to $B_4$ and a control signal from the controller 30. The first selecting circuit 31 selects one of the sampled signals $B_1$ to $B_4$ on the basis of the sampling timing selecting signal TSEL. The second selecting circuit 32 selects one of the sampled signals $B_1$ to $B_4$ other than the sampled signal selected by the first selecting circuit 31, on the basis of the sampling timing selecting signal TSEL. The subtracter 33 calculates the difference between the sampled signal from the first selecting circuit 31 and the sampled signal from the second selecting circuit 32, and outputs the difference as a tracking error signal TE.

A description will now be given of the operation of the fourth embodiment of the present invention.

First, regarding the reproduced signal B, the sampling is carried out at timings corresponding to the position of recording of the tracking pits $TP_m$ (m=1 to 4) on the basis of the sampling timing signal SMP. More concretely, when the timing control circuit 14 outputs the sampling timing signal SMP on the basis of the clock signal CLK, the first sample and hold part $SH_{11}$ samples and holds the input reproduced signal B at the sampling timing $T_1$, and outputs the sampled signal $B_1$. Similarly, the second sample and hold part $SH_{12}$ samples and holds the input reproduced signal B at the sampling timing $T_2$ on the basis of the sampling timing signal SMP, and outputs the sampled signal $B_2$. The third sample and hold part $SH_{13}$ samples and holds the input reproduced signal B at the sampling timing $T_3$, and outputs the sampled signal $B_3$. The fourth sample and hold part $SH_{14}$ samples and holds the input reproduced signal B at the sampling timing $T_4$ on the basis of the sampling timing signal SMP, and outputs the sampled signal $B_4$.

Figure 14A:
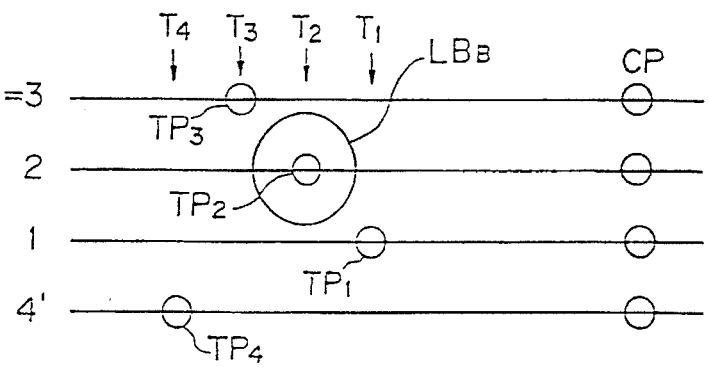
FIGS. 14A, 14B, 14C, 14D and 14E are respectively diagrams showing the operation of the third embodiment of the present invention.

Subsequently, the sampling timing selecting circuit 34 compares the sampled signals $B_1$ to $B_4$, and identifies the timing of the tracking pit formed on the recording track being reproduced. That is, the sampled signal having the greatest level (darkness) is identified as timing of the tracking pit. More concretely, in a case as shown in FIG. 14A, the sampling timing $T_2$ is selected as timing of the tracking pit $TP_2$.

Then, two sampling signals are selected in order to obtain the tracking error signal TE from the selected sampling timing. More specifically, on the basis of the selected sampling timing $T_2$, the timing selecting signal TSEL is output to the first selecting circuit 31 and the second selecting circuit 32 on the basis of a conversion table (see FIG. 15) stored beforehand. As a result, the sampled signal $B_1$ is selected and output by the first selecting circuit 31, and the sampled signal $B_3$ is selected and output by the second selecting circuit 32.

Similarly, when the sampling timing $T_1$ is selected, the sampled signal $B_4$ is selected and output by the first selecting circuit 31, and the sampled signal $B_2$ is selected by the second selecting circuit 32. When the sampling timing $T_3$ is selected, the sampled timing $B_2$ is selected and output by the first selecting circuit 31, and the sampled signal $B_4$ is selected and output by the second selecting circuit 32. When the sampling timing $T_4$ is selected, the sampled signal $B_3$ is selected and output by the first selecting circuit 31, and the sampled signal $B_1$ is selected and output by the second selecting circuit 32.

Hence, the subtracter 21 generates the tracking error signal TE in the following equation using the two sampled signals selected, by the first selecting circuit 31 and the second selecting circuit 32:

TE=(output of 1st selecting circuit 31) −(output of 2nd selecting circuit 32)

Figure 14B:
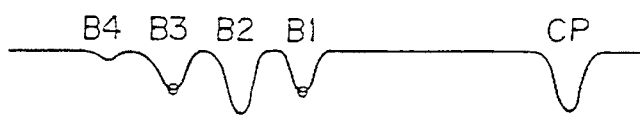

Thus, in a case where the light beam $LB_B$ is located on the recording track $TR_2$ being traced, as shown in FIG. 14A, the levels of the sampled signals respectively selected by the first selecting circuit 31 and the second selecting circuit 32 are equal to each other, as indicated by sampled signals $B_1$ and $B_3$ of the reproduced signal shown in FIG. 14B, and the tracking error signal TE ($=B_1-B_3$) becomes equal to zero.

Figure 14C:
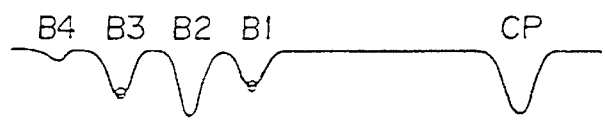

Next, a description will now be given of operation in the case where the light beam $LB_B$ deviates from the center line of the recording track $TR_2$.

i) Case where the light beam $LB_B$ is off towards the recording track $TR_3$:

FIG. 14C shows a waveform of the reproduced signal B (illustrated in a time sequence) observed when the light beam $LB_B$ is off towards the recording track $TR_3$. As compared to the on-track state (see FIG. 14B), the sampled signal $B_1$ of the reproduced signal B corresponding to the tracking pit $TP_1$ has a small read peak, while the sampled signal $B_3$ of the sampled signal B corresponding to the tracking pit $TP_3$, has a large read peak (see FIG. 14B). Hence, the tracking error signal TE is written as follows:

$$TE = B_1 - B_3 < 0$$

Figure 14D:
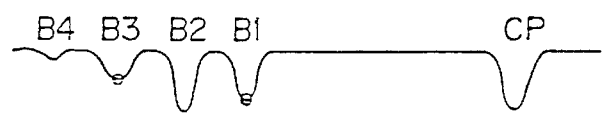

Hence, it is possible to detect a deviation of the read beam $LB_B$ towards the recording track $TR_3$ and the degree of such a deviation.

ii) Case where the read beam $LB_B$ is off towards recording track $TR_1$:

FIG. 14D shows waveforms of the reproduced signal B observed when the read beam $LB_B$ is off towards the recording track $TR_1$. As compared to the on-track state (see FIG. 14B), the sampled signal $B_1$ of the reproduced signal B corresponding to the tracking pit $TP_1$ has a large read peak, while the sampled signal $B_3$ of the reproduced signal B corresponding to the tracking pit $TP_3$, has a small peak (see FIG. 14B). Hence, the tracking error signal TE is written as follows:

$$TE = B_1 - B_3 > 0$$

Figure 14E:
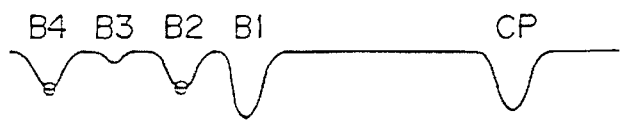

Hence, it is possible to detect a deviation of the read beam $LB_B$ towards the recording track $TR_3$ and the degree of such a deviation.

iii) Case where the light beam $LB_B$ is on the recording track $TR_1$:

A waveform (illustrated in a time sequence) of the reproduced signal observed when the light beam $LB_B$ on the recording track $TR_1$, is shown in FIG. 14E for reference. In this case, the read peak $B_1$ of the reproduced signal B corresponding to the tracking pit $TP_1$ is the greatest among the peaks $B_1$ to $B_4$, and the levels of the peaks $B_2$ and $B_4$ respectively corresponding to the tracking pits $TP_1$ and $TP_4$ are equal to each other. Hence, the tracking error signal TE is as follows:

$$TE = B_2 - B_4 = 0.$$

In this manner, it is possible to detect the light beam $LB_B$ located on the recording track $TR_1$.

As has been described above, according to the fourth embodiment, there is only one tracking pit every four tracks at a sampling timing even in the case where the track pitch is diminished in order to improve the recording density. Hence, there is no influence of the neighboring tracks, and it is possible to easily and certainly generate the tracking error signal by using three read beams each having the same size as that of the read beams which are conventionally used. Further, it is possible to simplify the structure of the recording apparatus because the tracking pits can be used in place of wobble pits and new wobble pits are not needed.

In the aforementioned embodiments of the present invention, the number of recording tracks corresponding to the period of the recording positions of tracking pits is equal to four. However, the present invention can be applied to optical disks in which the number of recording tracks corresponding to the cycle of the recording positions of tracking pits is equal to three or more.

According to the present invention, it is not necessary to form highly precise wobble pits on optical disks and it is hence possible to simplify the recording apparatus and easily record information on tracks arranged with a reduced track pitch.

It is also possible to record information with a high density and to easily and certainly generate the tracking error signal even for a reduced track pitch. It is also possible to increase the controllable pull-in range using the tracking error signal even for a reduced track pitch and to stably pull the read beam in a track.

It is also possible to count the number of recording tracks even when tracks are crossed at high speed because the count operation is performed by a unit of cycle of the recording positions of tracking pits.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk comprising:

a plurality of recording tracks, each of the recording tracks having a data area for storing data, and a servo control information area for storing servo information; and tracking pits respectively formed on n neighboring recording tracks, which are adjacent to each other in a radial direction of the optical disk, where n is an integer not less than 3, said tracking pits being located in the servo control information area of each of said n neighboring recording tracks and being spaced apart from each other by a distance not less than a radius of a beam spot for reading data from the optical disk, said tracking pits of said n neighboring recording tracks being located on different radial lines of the optical disk, said tracking pits of said n neighboring recording tracks being arranged in one line in a direction different from the radial direction of the optical disk, each of said tracking pits being disposed on a track center of the recording track;

and said disk being free of tracking pits disposed off-center of a recording track.

2. An optical disk according to claim 1, further comprising clock pits respectively formed on said n neighboring recording tracks for generating a clock signal, said clock pits being arranged in one line in the radial direction of the optical disk.

* * * * *